United States Patent [19]

Gibbon

[11] Patent Number: 4,719,065
[45] Date of Patent: Jan. 12, 1988

[54] METHOD OF BONDING SILICONE RUBBER TO METAL

[75] Inventor: Robert M. Gibbon, Fort Worth, Tex.

[73] Assignee: JMK International, Inc.

[21] Appl. No.: 18,866

[22] Filed: Feb. 25, 1987

Related U.S. Application Data

[63] Continuation of Ser. No. 800,557, Nov. 21, 1985.

[51] Int. Cl.$^4$ .................. B29C 39/12; B29C 45/16; B32B 15/08; C23C 8/06
[52] U.S. Cl. ........................... 264/135; 29/460; 29/527.4; 148/6.35; 156/245; 156/322; 156/329; 264/259; 264/265; 264/328.2; 264/331.11; 264/347; 264/DIG. 65; 277/1; 277/235 R; 277/235 A; 277/DIG. 6; 425/DIG. 47
[58] Field of Search ............. 264/80, 259, 265, 328.2, 264/331.11, 347, 236, 279, DIG. 65, 135; 425/DIG. 47; 156/82, 245, 322, 329; 29/460, 527.4; 277/1, 235 R, 235 A, DIG. 6; 148/6.35; 428/447, 450

[56] References Cited

U.S. PATENT DOCUMENTS

| | | |
|---|---|---|
| 2,095,198 | 10/1937 | Reid . |
| 2,686,654 | 8/1954 | Roush . |
| 2,871,141 | 1/1959 | Van Deusen . |
| 2,968,840 | 1/1961 | Morse ........................ 264/265 |
| 3,639,135 | 2/1972 | Hohman et al. . |
| 3,772,122 | 11/1973 | Young ........................ 156/329 |
| 3,844,030 | 10/1974 | Wilkinson .................. 264/347 X |
| 3,982,983 | 9/1976 | Abraham et al. ........... 156/322 X |
| 4,036,668 | 7/1977 | Brandon ..................... 148/6.35 |
| 4,115,607 | 9/1978 | Hasegawa et al. .......... 427/387 |
| 4,131,285 | 12/1978 | Denton et al. .............. 277/1 |
| 4,169,185 | 9/1979 | Bhatia ......................... 428/447 X |
| 4,220,342 | 9/1980 | Shah ........................... 156/329 X |
| 4,272,313 | 6/1981 | Mori et al. .................. 156/322 X |
| 4,580,794 | 4/1986 | Gibbon ....................... 277/1 X |

FOREIGN PATENT DOCUMENTS 58-89315 5/1983 Japan .......................... 264/265
WO82/00422 2/1982 PCT Int'l Appl. .......... 156/329

Primary Examiner—Jeffery Thurlow
Assistant Examiner—Leo B. Tentoni
Attorney, Agent, or Firm—James E. Bradley

[57] ABSTRACT

A method for bonding silicone rubber to a metal member is shown in which the metal member is first treated by heating the metal member to a temperature and for a time sufficient to form an oxide layer on the outer surface of the metal member. The treated metal member is then contacted with an uncured silicone rubber composition, and the silicone rubber composition is cured to bond the treated metal member to the silicone rubber composition.

3 Claims, 1 Drawing Figure

METHOD OF BONDING SILICONE RUBBER TO METAL

This application is a continuation of application Ser. No. 800,557, filed Nov. 21, 1985.

BACKGROUND OF THE INVENTION

1. Field of the Invention

The present invention relates generally to methods for achieving superior bonds between synthetic elastomers and metals and, specifically, to a method for achieving a superior bond between silicone rubber compositions and metals.

2. Description of the Prior Art

Various techniques are known in the art for adhering silicone rubber to metal surfaces. The normal technique for adhering silicone rubber to a metal member is to subject the metal member to a phosphating treatment prior to priming the metal member and contacting the member with the silicone rubber. The phosphating technique involves one or more hot alkali dip and rinse cycles, followed by a phosphate dip and rinse cycle. Good bonds can be obtained if the phosphate level is correct. However, if the phosphate concentration in the phosphate dip is too low or too high, poor bonds result.

Another prior art technique for preparing metal surfaces for bonding to silicone rubbers is sand blasting. Using this technique, the metal surface is silica sand blasted to remove scale, corrosion, and other foreign matter. The sand blasting technique is a cleaner process than phosphating but results in bonds of variable quality. The process is also labor intensive.

There exists a need for a method for forming an improved bond between silicone rubber and metal surfaces which consistently produces reliable bonds, which is not labor intensive, and which is an easy and clean process.

SUMMARY OF THE INVENTION

In the method of bonding silicone rubber to a metal member of the invention, the metal member is first treated by heating the metal member in the presence of oxygen to a temperature and for a time sufficient to form an oxide layer on the outer surface of the metal member. Thereafter, the treated metal member is contacted with an uncured silicone rubber composition and the silicone rubber composition is cured to bond the treated metal member to the silicone rubber composition.

A method is also shown for forming a silicone rubber gasket of the type having reinforcing metal members bonded to the silicone rubber. The metal members are first treated by heating in an atmospheric oven in the range from about 500° to 600° F. for a time sufficient to produce a blue coloration in the outer surface of the metal member which is visually distinguishable and which is characteristic of an oxide layer on the outer surface of the metal member. The treated metal member is allowed to cool to room temperature and is primed. Thereafter, the treated and primed metal member is contacted with an uncured silicone rubber composition and the silicone rubber composition is cured in a mold to bond the treated and primed metal member to the silicone rubber composition and form a reinforced gasket of the desired shape.

Additional objects and advantages will be apparent in the written description which follows.

DETAILED DESCRIPTION OF THE INVENTION

Figure 1:
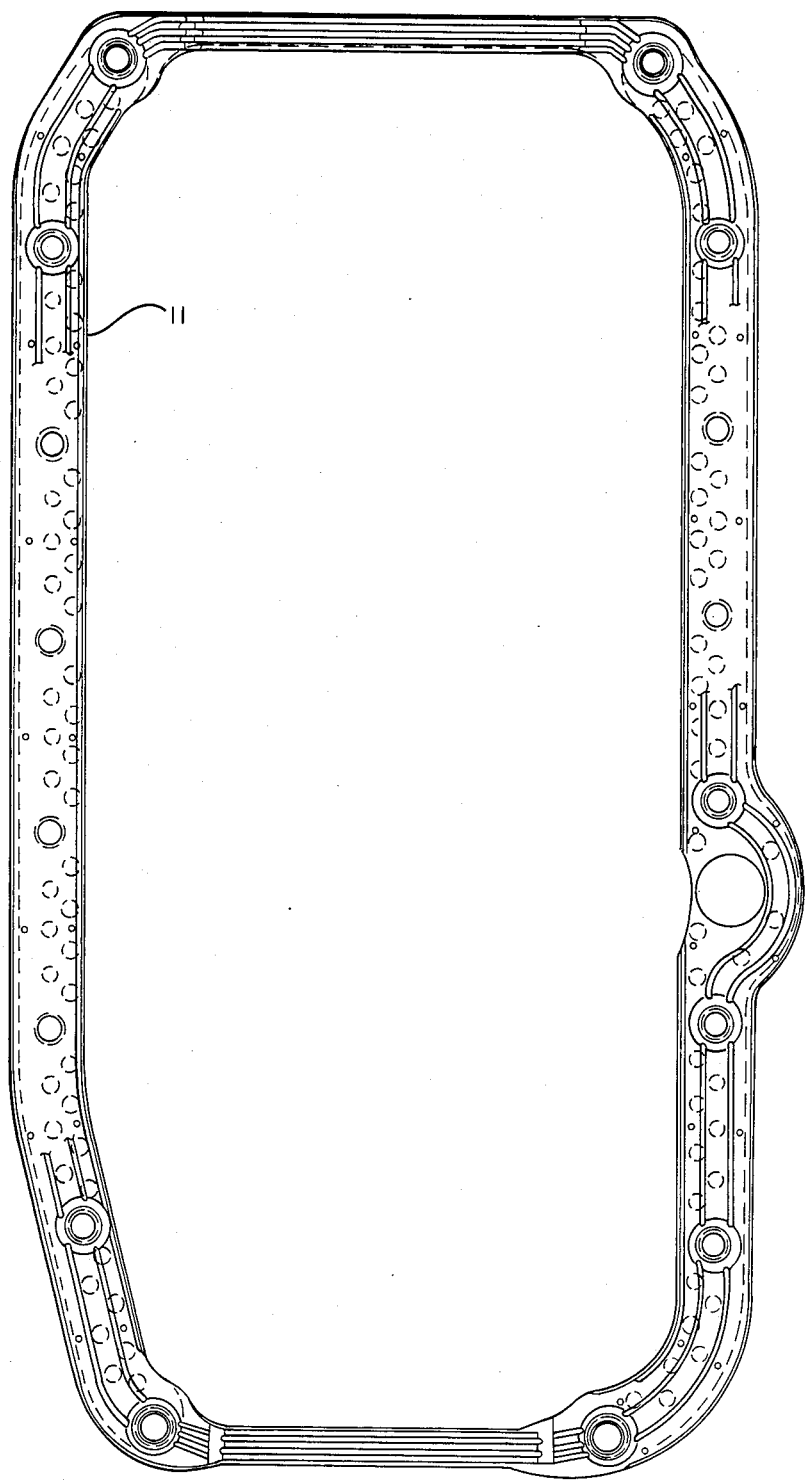
FIG. 1 is a top perspective view of a silicone rubber gasket having metal reinforcing rails embedded therein and bonded to the silicone rubber by the method of the invention.

In the method of the invention, the metal member to be bonded to silicone rubber is first "tinted" or treated by heating the metal member in the presence of oxygen to form an oxide layer on the outer surface of the metal member. When a bright piece of steel, such as results from machining or polishing, is heated in air, it will corrode, forming a thin surface film oxide. The thickness of this skin will vary largely with the temperature to which the steel is heated and, to a lesser extent, with the time held at that temperature. The oxides formed display a wide range of color and are sometimes referred to as "temper colors."

The following relationships between oxide layer colors and specified temperatures in 95% plain carbon steel have been observed.

| Colors (First Order) | Approximate Temp. |
| --- | --- |
| Yellow | 380° F. |
| Straw | 420° F. |
| Brown | 460° F. |
| Purple | 500° F. |
| Blue | 580° F. |

"Tempering", Metals Engineering Institute, American Society for Metals, page 10, 1977.

It should be noted that the above colors progress along the color range not only because of increasing temperature but also with the passage of time. Thus, if a piece of steel formed the yellow oxide at 380° F., continued holding at this temperature would result in a progressive color change to straw, brown, purple, and finally blue as the oxide layer thickens.

For purposes of forming the gasket shown in FIG. 1, side rails 11 were first formed from cold-rolled steel. The rails were then cut into lengths of about 14–15 inches. After degreasing, specimen side rails were heated in a recirculating atmospheric oven, with the following results:

| Temperature | Result |
| --- | --- |
| 600° F. | Heating for 10–15 min. produced a blue color indicating a receptive surface. |
| 500° F. | Heating for 1¼–2¼ hours produced a blue color indicating a receptive surface. |
| 400° F. | Heating for 7–8 hours produced a light brown color. |

The rails are preferably heated at about 580° F. for about 10 to 15 minutes to produce a blue coloration in the outer surface of the metal rails which is visually distinguishable and which is characteristic of an oxide layer on the outer surface of the metal rails. After cooling, the previously heat treated metal members are then primed with a suitable commercially available primer. The preferred primer is commercially available from Lord Corporation, Chemical Products Group, 2000 West Grandview Blvd., Erie, Pa., as "Chemlok 608."

Chemlok is described as an elastomer adhesive having a density of 7.2 pounds per gallon, having a flash point of 38° F. and a boiling range of 38°-142° F. The primer is preferably sprayed on the metal members.

Following the priming step, the metal member is contacted with an uncured silicone rubber composition. The silicone rubber composition is preferably blended from an organopolysiloxane elastomer and can include filler materials, processing aids, heat stabilizers, curing catalysts, and the like. The silicone rubber composition utilized to form the gaskets of the invention is adapted to be heat cured in a mold in the desired shape or extruded and vulcanized. Silicone rubber compositions of the above type are well known and can be prepared by standard methods known in the art. A discussion of the preparation of such compounds can be found, for example, in: Eaborn C., Organosilicone Compounds, Academic Press, New York, 1960; McGregor, R. R., Silicones and Their Uses, McGraw-Hill Book Company, New York, 1954; Meals, R. N., and F. M. Lewis, Silicones, Reinhold Publishing Corp., New York, 1959; Montermoso, J. C., "Silicone Rubbers", Chapter 16, in Morton, E. D., Introduction to Rubber Technology, Reinhold Publishing Corp., New York, 1959; Rochow, E. G., An Introduction to the Chemistry of Silicones, Second Edition, John Wiley and Sons, New York, 1951.

A preferred silicone rubber composition is comprised of 100 parts by weight of dimethylvinylsiloxy-ended polydiorganosiloxane gum having as a percentage of all organic radicals in the gum, 99.85% by weight methyl radicals and 0.15% by weight vinyl radicals; 7 parts by weight hydroxyl-ended polydimethylsiloxane having about 3.0 weight percent silicon bonded hydroxyl; 30 parts by weight fumed silica filler having a surface area of 300 $m^2/g$; and 0.8 parts by weight of 2.5-dimethyl-2.5 (t-butylperoxy)hexane.

In addition to the above described ingredients, the silicon rubber compositions of the invention can contain heat stability additives, compression set additives, additives to improve handling properties, dyes or coloring additives, additives to prevent crepe aging and other additives conventionally found in heat cured silicone elastomers. In the preferred method of forming a gasket of the invention, the silicon rubber composition is made by blending or milling together the various constituents. The order of adding the elastomer, filler and additional additives is not critical. Preferably, and organopolysiloxane elastomer, filler material and conventional additives are mixed together to form the uncured rubber composition. Although the preferred method of blending is to hot mix the rubber composition, it will be understood that the composition can also be cold mixed. The preferred rubber composition is then cooled, the curing agent is added. The previously degreased, treated and primed metal rails are then placed between the upper and lower platens of a mold with the rails in a mold cavity of the desired configuration for the gasket which is to be formed.

The uncured silicone rubber composition is then injected into the mold cavity so that the uncured silicone rubber composition contacts the treated and primed metal rails. The silicone rubber composition is then heat cured in the mold to bond the treated and primed metal rail to the silicone rubber composition and form a reinforced gasket of the desired shape. The temperature at which the rubber compositions are cured to the solid elastomeric state depend upon the particular curing catalyst chosen, the duration of the cure, amount and type of filler, etc. For the compositions in question, curing using molding conditions of 340° F. for 10 minutes is acceptable.

An invention has been provided with several advantages. The preliminary "heat tinting" step provides improved bonding of the silicone rubber composition to the metal part. The blue coloration of the metal surface provides a visual indication of a receptive surface capable of superior bonding to the silicone rubber composition. The heat tinting process is less labor intensive than said blasting and provides superior results. The process of the invention is also easier and cleaner than phosphating and produces superior results.

While the invention has been shown in only one of its forms, it is not thus limited but is susceptible to various changes and modifications without departing from the spirit thereof.

I claim:

1. A method of forming a silicone rubber gasket of the type having a reinforcing metal member bonded to the silicone rubber, comprising the steps of:

first, treating an unroughened metal member by heating the metal member in an atmospheric oven in the range of about 500°-600° F. for less than one hour to produce a change in coloration in the outer surface of the metal member which is visually distinguishable and which is characteristic of an oxide layer on the outer surface of the metal member;

allowing the treated metal member to cool;

applying a primer to the metal member; and thereafter, contacting the treated and primed metal member with an uncured silicone rubber composition and curing the silicone rubber composition in a mold with heat to bond the treated and primed metal member to the silicone rubber composition and form a reinforced gasket of the desired shape.

2. A method of forming a silicone rubber gasket of the type having reinforcing metal rails bonded to the silicone rubber, comprising the steps of:

first, treating unroughened metal rails by heating the metal rails in an atmospheric oven in the range of about 500°-600° F. for about 10 to 15 minutes to produce a change in coloration in the outer surface of the metal rails which is visually distinguishable and which is characteristic of an oxide layer on the outer surface of the metal rails;

allowing the treated metal rails to cool to room temperature;

applying a primer to the metal rails;

placing the treated and primed metal rails between the upper and lower platens of a mold with the rails in a mold cavity of the desired configuration for the gasket which is to be formed;

injecting an uncured silicone rubber composition into the mold cavity so that the uncured silicone rubber composition contacts the treated and primed metal rails, the silicone rubber composition comprising an organopolysiloxane elastomer, fumed silica filler, and peroxide catalyst; and thereafter, heat curing the silicone rubber composition in the mold to bond the treated and primed metal rails to the silicone rubber composition and form a reinforced gasket of the desired shape.

3. The method of claim 2, wherein the silicone rubber composition is a dimethylvinyl siloxy-ended polydiorganosiloxane gum which is peroxide cured.

* * * * *